United States Patent Office 3,025,261
Patented Mar. 13, 1962

3,025,261
COMPOSITIONS OF SYNTHETIC CONJUGATED DIENE RUBBERS PLASTICIZED WITH SOFT ELASTOMERIC COPOLYMERS OF BETA-AR,AR,-TRICHLOROSTYRENE AND CONJUGATED DIOLEFINS
George B. Sterling, Midland, Mich., assignor to The Dow Chemical Company, Midland, Mich., a corporation of Delaware
No Drawing. Filed June 30, 1958, Ser. No. 745,315
14 Claims. (Cl. 260—45.5)

This invention relates to plasticized synthetic rubber-like substances and pertain especially to compositions comprising a predominant amount of a synthetic rubber intimately incorporated with a minor amount of a soft elastomeric copolymer containing a conjugated diolefin or a derivative thereof and beta-trichlorostyrene in chemically combined form.

It is known to incorporate plasticizers, e.g. dibutylphthalate, or oil extenders with synthetic rubber to improve the softness and processing characteristics of the rubber. However, since the vulcanized products are generally used in contact with fuels, oils or other solvent materials the plasticizer is often leached out and lost, thereby contaminating the fluid and detracting from the rubber properties of the product and frequently results in embrittlement and failure of the product.

It is an object of the invention to provide new compositions of matter consisting essentially of a synthetic rubber plasticized with soft copolymers containing an aliphatic conjugated diolefin or a derivative thereof and beta-trichlorostyrene in chemically combined form. Another object is to provide plasticized compositions consisting of a synthetic rubber and a soft copolymer of an aliphatic conjugated diolefinic compound and beta-trichlorostyrene, which compositions are easily processed so that the addition of compounding and curing agents is facilitated. A further object is to provide synthetic rubber compositions having improved softness and processing characteristics and containing elastomeric copolymer plasticizers which resist extraction from the synthetic rubber.

According to the invention the foregoing and related objects are obtained by intimately incorporating with a synthetic rubber, a soft elastomeric copolymer containing in chemically combined form from 10 to 60 percent by weight of beta-trichlorostyrene, at least 35 percent of an aliphatic conjugated diolefinic compound and not more than 40 percent, e.g. from 0 to 40 percent, of one or more other monoethylenically unsaturated organic compounds copolymerizable therewith and having a single polymerizable group of the formula $H_2C=C=$, per 100 parts by weight of the copolymer, in proportions and kind as more fully hereinafter described.

More specifically, the compositions of the invention consist of blends of from 60 to 90 percent by weight of a synthetic rubber and from 40 to 10 percent of a soft elastomeric copolymer containing beta-trichlorosytrene and an aliphatic conjugated diolefinic compound chemically combined or interpolymerized with one another which soft copolymer has a molecular weight between about 1500 and 50,000 as determined by static osmotic pressure measurements. (See Fundamental Principles of Physical Chemistry, Prutton and Maron, pages 199–206 (1951), MacMillan Company.)

The soft elastomeric copolymer can be an addition copolymer of an aliphatic conjugated diolefin or a derivative thereof such as butadiene, isoprene, chloroprene, chloroisoprene or 2,3-dimethylbutadiene-1,3 and beta-2,3-trichlorostyrene, beta-2,4-trichlorostyrene or beta-2,5-trichlorostyrene or mixtures of the isomeric beta-trichlorostyrenes, or copolymers of such compounds and one or more other monoethylenically unsaturated organic compounds copolymerizable therewith such as monovinyl aromatic hydrocarbons of the benzene series or nuclear halogenated monovinyl aromatic hydrocarbons, e.g. styrene, vinyltoluene, vinylxylene, ethylvinylbenzene, isopropylstyrene, chlorostyrene, dichlorostyrene, fluorostyrene or the like; an unsaturated ketone such as methyl vinyl ketone, methyl isopropenyl ketone; a vinyl ether such as ethyl vinyl ether, butyl vinyl ether; a vinyl ester such as vinyl acetate, vinyl propionate, or vinyl stearate; an ester of acrylic acid or methacrylic acid such as the methyl, ethyl, propyl, butyl, hexyl or 2-ethylhexyl esters of acrylic acid or the methyl, ethyl or butyl esters of methacrylic acid; or acrylonitrile. Such other monoethylenically unsaturated organic compounds are employed in amounts of from 5 to 40 percent by weight of the total weight of the monomers employed in making the soft elastomeric copolymers. The soft copolymers are preferably copolymers of one or more aliphatic conjugated diolefins or a derivative thereof, e.g. butadiene, isoprene or chloroprene, and one or more of the isomeric beta-trichlorostyrenes containing from 10 to 60, preferably from 30 to 60, percent by weight of the beta-trichlorostyrene chemically combined in the copolymer molecules and having a molecular weight within the range previously stated. In general, the soft copolymers have a viscosity characteristic corresponding to from 1 to 4 centipoises as determined for a 3 weight percent solution of the copolymer in toluene at 25° C.

The soft elastomeric copolymers can be prepared by polymerizing a mixture of the monomers in known ways, e.g. in an aqueous emulsion, employing a procedure and recipe similar to those employed for the production of synthetic rubbers.

The synthetic rubber to be employed in as starting material in preparing the compositions of the invention can be a homopolymer or copolymer of an aliphatic conjugated diolefin or a derivative thereof such as butadiene, isoprene, chloroprene, chloroisoprene, or 2,3-dimethylbutadiene-1,3, or copolymers of such conjugated compounds and monoethylenically unsaturated organic compounds such as styrene, vinyltoluene, acrylonitrile, methyl isopropenyl ketone. Examples of suitable synthetic rubbers are polybutadiene, polyisoprene, neoprene, and rubber-like copolymers of butadiene and styrene, butadiene and acrylonitrile, butadiene-acrylonitrile-methyl isopropenyl ketone, butadiene-styrene-methyl isopropenyl ketone and the like. In general the synthetic rubbers have a Mooney viscosity of from 50 to 150 or above, suitably a Mooney viscosity of from 80 to 150.

The compositions are prepared by milling, compounding or malaxating the synthetic rubber and the soft elastomeric copolymer ingredients in admixture with one another on compounding rolls, a Banbury mixer or a plastics extruder at room temperature or thereabout or at elevated temperatures, in the desired proportions to form a uniform composition.

Additives such as pigments, dyes, antioxidants, lubricants, stabilizing agents, mold release agents, and the like can be incorporated with the polymeric ingredients, but are not required. Such additives, when used are employed in amounts of from about 1 to 10 percent by weight of the polymeric ingredients.

The plasticized rubber compositions can readily be compounded with additives such as carbon black, vulcanizing agents, accelerators, etc., and cured to form rubber products possessing good elongation and tensile strength properties from which the plasticizer cannot be extracted. The compositions are useful for a variety of purposes, e.g. for making gaskets, tubes, pipes, stoppers, mats, electrical insulation, for which rubber products are usually employed in the home and industry.

The following examples illustrate ways in which the principle of the invention has been applied, but are not to be construed as limiting its scope.

EXAMPLE 1

In each of a series of experiments, a rubbery copolymer was prepared by polymerizing a mixture of monomers consisting of ar,ar,beta-trichlorostyrene, butadiene or ioprene in proportion and kind as stated in the following table in an aqueous emulsion. The ar,ar,beta-trichlorostyrene employed in the experiments was a mixture of isomeric compounds obtained as a fraction boiling at 70°–76° C. at 0.4 millimeter absolute pressure and consisted of 67 percent by weight of beta-2,5-trichlorostyrene, 30 percent of beta-2,4-trichlorostyrene, about one percent of betal-2,3-trichlorostyrene and about 2 percent of ar-dichlorostyrene, as determined by infrared analysis. The recipe and procedure for making the copolymer was as follows.

| Ingredients: | Parts by weight |
|---|---|
| Monomers | 100 |
| Water | 123 |
| Duponol WAQ (fatty alcohol sodium sulfate) | 3.03 |
| Tert.-dodecyl mercaptan | 0.5 |
| Potassium persulfate | 0.75 |
| Sodium bicarbonate | 1.0 |

The sodium bicarbonate, potassium persulfate, Duponol WAQ and water were placed in a pressure-resistant vessel and the monomers and tert.-dodecyl mercaptan were added.

The mixture was vigorously agitated in the closed vessel to effect emulsification, then was heated with mild stirring at a temperature of 60° C. for a period of from 24 to 48 hours to polymerize the monomers. The polymerization was continued until complete or substantially complete. Thereafter, the pressure was released. The mixture was removed from the reaction vessel as a synthetic latex. The latex was steam distilled by heating the same to a temperature of about 100° C. and bubbling steam therethrough to distill and remove unreacted monomers from the latex. A weighed portion of the stripped latex was analyzed to determine the percent of copolymer therein. Thereafter, an aqueous emulsion containing 3 percent by weight, based on the weight of the copolymer, of 2,4-dimethyl-6-(1-methylcyclohexyl)phenol as stabilizer was mixed with the main portion of the latex. The copolymer was recovered by coagulating the latex, separating, washing and drying the coagulum in a vacuum oven at a temperature of 60° C. at an absolute pressure between 5 and 10 millimeters.

Table I identifies the copolymer by giving the proportions of the monomers employed in preparing the same. The table gives the percent yield or percent of polymerization of the monomers and the percent of beta-trichlorostyrene chemically combined in the copolymer product as determined by analysis.

the copolymers prepared in Example 1 was milled on compounding rolls with a synthetic rubber (GR-S type 1006, a rubbery copolymer of 76.5 percent by weight of butadiene and 23.5 percent of styrene) in proportions as stated in the following table to form a homogeneous mixture. The resulting mixture was compounded with added ingredients to form a test composition employing the recipe:

| Ingredients— | Parts by weight |
|---|---|
| Copolymer blend | 100 |
| Carbon black | 40 |
| Zinc oxide | 5 |
| Sulfur | 2 |
| Stearic acid | 1 |
| Altax (benzothiazil disulfide) | 1 |

The ingredients were compounded on cold rolls to a uniform composition, then rolled into a sheet ⅛-inch thick and cured under pressure at a temperature of 300° F. for a period of 40 minutes. Test pieces were cut from the cured sheet. The test pieces were used to determine the tensile strength and percent elongation employing procedures similar to those described in ASTM D412–51T. Hardness was determined by procedure similar to that described in ASTM D676–47T. Table II identifies the beta-trichlorostyrene copolymer employed by reference to the Run No. in Table I and gives the proportions of said copolymer and GR–S type rubber employed in making the compositions. The table also gives the properties determined for the cured rubber composition or product.

Table II

| | Starting materials | | Product | | | |
|---|---|---|---|---|---|---|
| Run No. | beta-Trichlorostyrene copolymer from Table I | | GR–S rubber, percent | Tensile strength, lbs./sq. in. | Elongation, percent | Shore hardness |
| | No. | Percent | | | | A | C |
| 1 | | | 100 | 1,140 | 200 | 71 | 35 |
| 2 | 1 | 20 | 80 | 1,260 | 270 | 70 | 32 |
| 3 | 2 | 5 | 95 | 1,370 | 370 | 65 | 31 |
| 4 | 2 | 10 | 90 | 1,240 | 320 | 65 | 32 |
| 5 | 2 | 20 | 80 | 1,090 | 260 | 60 | 30 |
| 6 | 3 | 10 | 90 | 1,070 | 330 | 70 | 30 |
| 7 | 3 | 20 | 80 | 1,190 | 220 | 65 | 30 |
| 8 | 4 | 5 | 95 | 1,600 | 350 | 70 | 34 |
| 9 | 4 | 10 | 90 | 1,750 | 390 | 70 | 31 |
| 10 | 4 | 20 | 80 | 1,180 | 270 | 70 | 31 |
| 11 | 5 | 5 | 95 | 1,440 | 300 | 70 | 31 |
| 12 | 5 | 10 | 90 | 1,430 | 280 | 72 | 32 |

EXAMPLE 3

In each of a series of experiments a portion of one of the beta-trichlorostyrene copolymers prepared in Example 1 was compounded with neoprene and other ingredients employing the recipe and procedures as described in Example 2. The product was cured and tested employing

Table I

| | Starting materials | | | Polymerizing conditions | | Copolymer | | | |
|---|---|---|---|---|---|---|---|---|---|
| Run No. | Butadiene, percent | Isoprene, percent | beta-Trichloro styrene, percent | Temp., ° C. | Time, Hrs. | Yield, percent | beta-Trichloro styrene, percent | Diolefin percent | |
| 1 | 50 | 0 | 50 | 60 | 24 | 90 | 34 | 66 | Soft—tacky. |
| 2 | 40 | 0 | 60 | 60 | 24 | 92 | 45.4 | 54.6 | Do. |
| 3 | 30 | 0 | 70 | 60 | 24 | 89 | 54 | 46 | Very soft—tacky. |
| 4 | 0 | 50 | 50 | 60 | 24 | 89 | 48.5 | 51.5 | Soft—tacky. |
| 5 | 0 | 80 | 20 | 60 | 24 | 97 | 14.2 | 85.8 | Do. |

EXAMPLE 2

In each of a series of experiments, a portion of one of procedures similar to those employed in the preceding example. Table III identifies the beta-trichlorostyrene copolymer employed by reference to the Run No. in Table I and gives the proportions of said copolymer and neoprene employed in making the composition. The table also gives the properties determined for the product.

Table III

| Run No. | Starting materials | | Neoprene, percent | Product | | | |
|---|---|---|---|---|---|---|---|
| | beta-Trichlorostyrene from Table I | | | Tensile strength, lbs./sq. in. | Elongation, percent | Shore hardness | |
| | No. | Percent | | | | A | C |
| 1 | | | 100 | 1,830 | 210 | 80 | 44 |
| 2 | 1 | 5 | 95 | 2,820 | 270 | 80 | 46 |
| 3 | 1 | 10 | 90 | 2,250 | 225 | 79 | 46 |
| 4 | 1 | 20 | 80 | 2,660 | 250 | 80 | 45 |
| 5 | 2 | 5 | 95 | 2,500 | 280 | 79 | 46 |
| 6 | 2 | 10 | 90 | 1,650 | 140 | 79 | 49 |
| 7 | 2 | 20 | 80 | 2,140 | 230 | 75 | 47 |
| 8 | 3 | 5 | 95 | 2,590 | 270 | 77 | 45 |
| 9 | 3 | 10 | 90 | 2,580 | 280 | 76 | 41 |
| 10 | 3 | 20 | 80 | 2,680 | 250 | 76 | 45 |
| 11 | 4 | 5 | 95 | 2,580 | 370 | 75 | 40 |
| 12 | 4 | 10 | 90 | 2,300 | 340 | 76 | 41 |
| 13 | 4 | 20 | 80 | 2,340 | 330 | 75 | 39 |
| 14 | 5 | 5 | 95 | 2,640 | 380 | 76 | 44 |
| 15 | 5 | 10 | 90 | 2,440 | 320 | 76 | 43 |
| 16 | 5 | 20 | 10 | 2,660 | 310 | 75 | 40 |

EXAMPLE 4

In each of a series of experiments a soft copolymer containing in chemically combined form 54.8 percent by weight of beta-trichlorostyrene and 45.2 percent of butadiene, prepared by procedure similar to that described in Example 1 was compounded with a synthetic rubber of a kind and in proportions as stated in the following table to form a homogeneous composition. The copolymer and the synthetic rubber were milled on cold compounding rolls at room temperature for a period of about 10 minutes then was rolled into a sheet. Test pieces of the sheet were employed to determine a Mooney viscosity for the product. Table IV identifies the synthetic rubber and gives the proportions of the same and the beta-trichlorostyrene copolymer employed in making the plasticized rubber composition. The table also gives a Mooney number or viscosity for the product as determined in accordance with ASTM D927–49T.

Table IV

| Run No. | Synthetic rubber | | beta-Trichlorostyrene copolymer, percent | Mooney number ML1+4 (212° F.) |
|---|---|---|---|---|
| | Copolymer of— | Percent | | |
| 1 | Polybutadiene | 100 | 0 | 144 |
| 2 | do | 90 | 10 | 113 |
| 3 | do | 80 | 20 | 85.8 |
| 4 | do | 70 | 30 | 58.4 |
| 5 | 77% butadiene–23% styrene | 100 | 0 | 110 |
| 6 | do | 90 | 10 | 93 |
| 7 | do | 80 | 20 | 71 |
| 8 | do | 70 | 30 | 48 |
| 9 | do | 60 | 40 | 36 |
| 10 | 65% butadiene–35% acrylonitrile | 100 | 0 | 92 |
| 11 | do | 90 | 10 | 61 |
| 12 | do | 80 | 20 | 43 |
| 13 | do | 70 | 30 | 24 |
| 14 | 60% butadiene–20% styrene–20% methyl isopropenyl ketone | 100 | 0 | 95 |
| 15 | do | 90 | 10 | 56.4 |
| 16 | do | 80 | 20 | 49 |
| 17 | do | 70 | 30 | 32 |
| 18 | 60% butadiene–20% acrylonitrile–20% methyl isopropenyl ketone | 100 | 0 | 82.2 |
| 19 | do | 90 | 10 | 67.4 |
| 20 | do | 80 | 20 | 49 |
| 21 | do | 70 | 30 | 34 |
| 22 | 60% butadiene–20% styrene–20% acrylonitrile | 100 | 0 | 119.6 |
| 23 | do | 90 | 10 | 95 |
| 24 | do | 80 | 20 | 61 |
| 25 | do | 70 | 30 | 48 |
| 26 | Neoprene | 100 | 0 | 55 |
| 27 | do | 90 | 10 | 17 |
| 28 | do | 80 | 20 | 13.6 |

EXAMPLE 5

In each of a series of experiments a copolymer containing in chemically combined form 54.4 percent by weight of beta-trichlorostyrene, 5 percent of methyl isopropenyl ketone and 40.6 percent of butadiene was milled with a synthetic rubber of a kind and in proportions as stated in the following table to form a plasticized rubber composition. Table V identifies the synthetic rubber and gives the Mooney number for the plasticized rubber product.

Table V

| Run No. | Synthetic rubber | | beta-Trichlorostyrene copolymer, percent | Mooney number ML1+4 (212° F.) |
|---|---|---|---|---|
| | Copolymer of— | Percent | | |
| 1 | Polybutadiene | 100 | 0 | 144 |
| 2 | do | 90 | 10 | 90 |
| 3 | do | 80 | 20 | 53 |
| 4 | do | 70 | 30 | 45.6 |
| 5 | do | 60 | 40 | 25 |
| 6 | 77% butadiene–23% styrene | 100 | 0 | 110 |
| 7 | do | 90 | 10 | 88 |
| 8 | do | 80 | 20 | 56 |
| 9 | do | 70 | 30 | 40 |
| 10 | 65% butadiene–35% acrylonitrile | 100 | 0 | 92 |
| 11 | do | 90 | 10 | 64.4 |
| 12 | do | 80 | 20 | 45 |
| 13 | do | 70 | 30 | 24 |
| 14 | 60% butadiene–20% styrene–20% methyl isopropenyl ketone | 100 | 0 | 95 |
| 15 | do | 90 | 10 | 60 |
| 16 | do | 80 | 20 | 46.2 |
| 17 | do | 70 | 30 | 34 |
| 18 | 60% butadiene–20% acrylonitrile–20% methyl isopropenyl ketone | 100 | 0 | 82.2 |
| 19 | do | 90 | 10 | 58 |
| 20 | do | 80 | 20 | 47 |
| 21 | do | 70 | 30 | 35 |
| 22 | 60% butadiene–20% styrene–20% acrylonitrile | 100 | 0 | 119.6 |
| 23 | do | 90 | 10 | 85 |
| 24 | do | 80 | 20 | 67.6 |
| 25 | do | 70 | 30 | 45 |
| 26 | do | 60 | 40 | 32 |
| 27 | Neoprene | 100 | 0 | 55 |
| 28 | do | 90 | 10 | 22 |
| 29 | do | 80 | 20 | 15 |

A charge of 30 parts by weight of a copolymer containing in chemically combined form 54.8 percent by weight of beta-trichlorostyrene and 45.2 percent of butadiene, prepared by procedure similar to that described in Example 1, which copolymer had a viscosity characteristic of 1.27 centipoises as determined for a 3 weight percent solution of the copolymer in toluene at 25° C., was blended with 70 parts by weight of a rubbery copolymer of 77 percent by weight of butadiene and 23 percent of styrene, which rubbery copolymer had a Mooney number of 110. The resulting product had a Mooney number of 48. This product was compounded with added ingredients employing the recipe and procedures described in Example 2 and cured to form a vulcanized rubber product. The vulcanized product had the properties:

Tensile strength _____ lbs./sq. in __ 1,460
Elongation _____ percent __ 500
Shore hardness A _____ 50
Shore hardness C _____ 14

The product swelled in benzene, carbon tetrachloride and diisobutylene, but did not dissolve. The loss in weight by swelling in such solvents was only 1.3 percent.

I claim:
1. A plasticized rubber-like composition of matter, the essential ingredients of which consist of from 60 to 90 percent by weight of a rubbery polymer selected from the group consisting of polybutadiene, polychloroprene, copolymers of butadiene and styrene, copolymers of butadiene and acrylonitrile, copolymers of butadiene, styrene and methyl isopropenyl ketone, copolymers of butadiene, acrylonitrile and methyl isopropenyl ketone and copolymers of butadiene, acrylonitrile and styrene, said rubbery polymer having a Mooney number between 50 and 150, intimately incorporated with from 40 to 10 percent by weight of a soft copolymer containing in chemically combined form from 10 to 60 percent by weight of beta-ar, ar-trichlorostyrene, at least 35 percent by weight of a conjugated diolefin selected from the group consisting of isoprene and butadiene and from 0 to 40 percent of another monoethylenically unsaturated organic compound copolymerizable therewith and having a single polymerizable group of the formula $H_2C=C<$ and selected from the group consisting of styrene, acrylonitrile and methyl isopropenyl ketone, said soft copolymer having a molecular weight between 1500 and 50,000.

2. A plasticized rubber-like composition of claim 1, wherein the rubbery polymer is polybutadiene and the soft copolymer is a copolymer of beta-ar,ar-trichlorostyrene and butadiene.

3. A plasticized rubber-like composition of claim 1, wherein the rubbery polymer is a copolymer of butadiene and styrene and the soft copolymer is a copolymer of beta-ar,ar-trichlorostyrene and butadiene.

4. A plasticized rubber-like composition of claim 1, wherein the rubbery polymer is a copolymer of butadiene and acrylonitrile and the soft copolymer is a copolymer of beta-ar, ar-trichlorostyrene and butadiene.

5. A plasticized rubber-like composition of claim 1, wherein the rubbery polymer is a copolymer of butadiene, acrylonitrile and methyl isopropenyl ketone and the soft copolymer is a copolymer of beta-ar,ar-trichlorostyrene, methyl isopropenyl ketone and butadiene.

6. A plasticized rubber-like composition of claim 1, wherein the rubbery polymer is a copolymer of butadiene, styrene and methyl isopropenyl ketone and the soft copolymer is a copolymer of beta-ar,ar-trichlorostyrene and butadiene.

7. A plasticized rubber-like composition of claim 1, wherein the rubbery polymer is a copolymer of butadiene, styrene and methyl isopropenyl ketone and the soft copolymer is a copolymer of beta-ar,ar-trichlorostyrene, methyl isopropenyl ketone and butadiene.

8. A plasticized rubber-like composition of claim 1, wherein the rubbery polymer is a copolymer of butadiene and styrene and the soft copolymer is a copolymer of beta-ar,ar-trichlorostyrene, methyl isopropenyl ketone and butadiene.

9. A plasticized rubber-like composition of claim 1, wherein the rubbery polymer is a copolymer of butadiene and acrylonitrile and the soft copolymer is a copolymer of beta-ar,ar-trichlorostyrene, methyl isopropenyl ketone and butadiene.

10. A plasticized rubber-like composition of claim 1, wherein the rubbery polymer is a copolymer of butadiene, styrene and acrylonitrile and the soft copolymer is a copolymer of beta-ar,ar-trichlorostyrene and butadiene.

11. A plasticized rubber-like composition of claim 1, wherein the rubbery polymer is a copolymer of butadiene, styrene and acrylonitrile and the soft copolymer is a copolymer of beta-ar,ar-trichlorostyrene, methyl isopropenyl ketone and butadiene.

12. A plasticized rubber-like composition of claim 1, wherein the rubbery polymer is a copolymer of butadiene, acrylonitrile and methyl isopropenyl ketone and the soft copolymer is a copolymer of beta-ar,ar-trichlorostyrene and butadiene.

13. A plasticized rubber-like composition of claim 1, wherein the rubbery polymer is chloroprene polymer and the soft copolymer is a copolymer of beta-ar,ar-trichlorostyrene and butadiene.

14. A plasticized rubber-like composition of claim 1, wherein the rubbery polymer is chloroprene polymer and the soft copolymer is a copolymer of beta-ar,ar-trichlorostyrene, methyl isopropenyl ketone and butadiene.

References Cited in the file of this patent

UNITED STATES PATENTS

| | | |
|---|---|---|
| 2,463,897 | Michalek | Mar. 8, 1949 |
| 2,614,093 | Wheelock | Oct. 14, 1952 |